Figure 1:
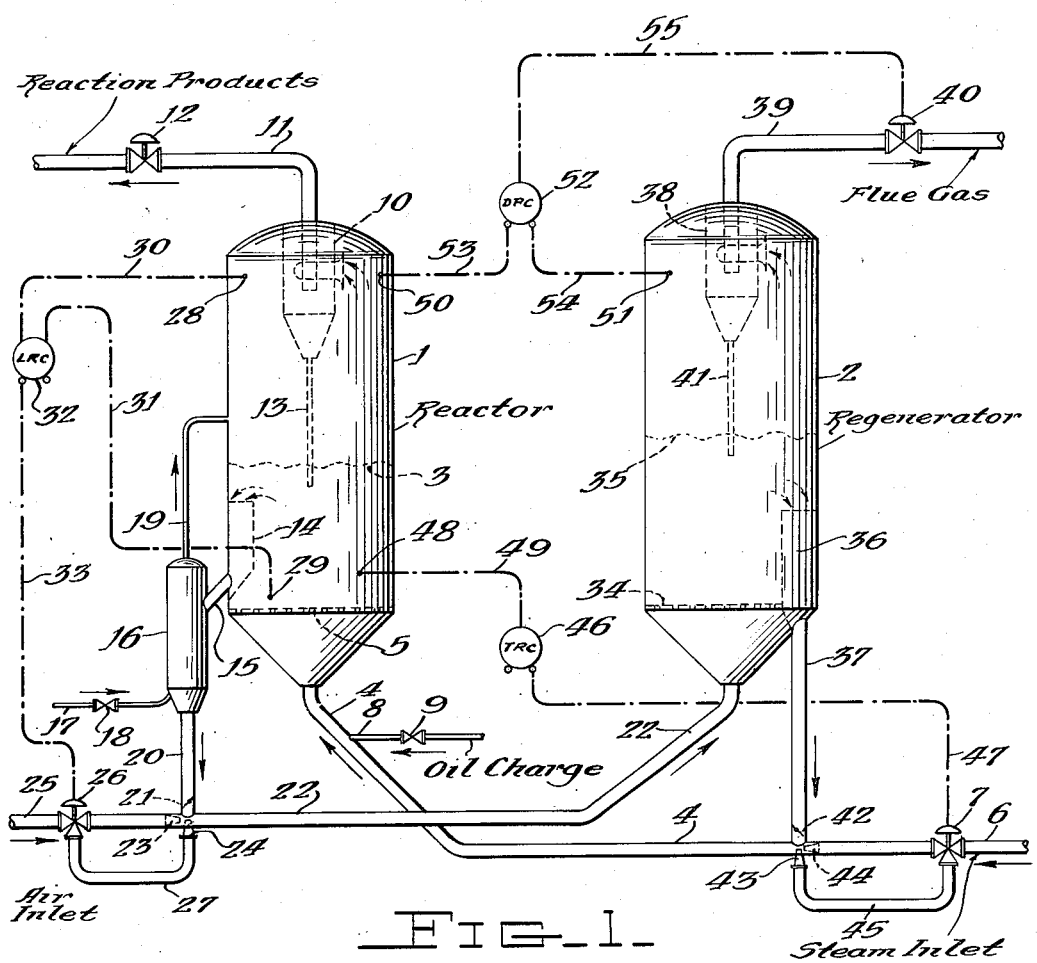

Feb. 5, 1952    J. BEAM    2,584,378
FLOW CONTROL OF PARTICLES IN FLUIDIZED PROCESSING
Filed Dec. 23, 1949

Inventor:
Jon Beam
By: M. P. Venema
Philip F. Liggett
Attorney
Agent

Patented Feb. 5, 1952

2,584,378

UNITED STATES PATENT OFFICE 2,584,378

FLOW CONTROL OF PARTICLES IN FLUIDIZED PROCESSING

Jon Beam, Blue Ridge, Ga., assignor to Universal Oil Products Company, Chicago, Ill., a corporation of Delaware Application December 23, 1949, Serial No. 134,757

9 Claims. (Cl. 196—52)

This invention relates to means for effecting the control of the flow or transfer of particles from one contacting zone to another in fluidized processing operations, and more particularly to the utilization of jet-like streams of a gas or vapor to control the rate of withdrawal and transfer of subdivided particles from each of the contacting zones in a manner which eliminates the need of expensive type of slide valves or similar mechanical control means.

In the usual fluidized unit, such as the fluidized catalyst plants that are used in the petroleum and chemical processing fields, the subdivided catalyst particles are contacted in at least two separate confined zones, a reaction chamber and a reactivation chamber. The particles being continuously passed from one chamber to another to provide a continuous conversion process. The rate of withdrawal of particles and transfer between zones, has in general been controlled by the use of slide valves placed in the particle withdrawal conduits or standpipes from each of the contacting zones. The particles being withdrawn in a substantially fluidized column from the respective contacting beds within each of the conversion contacting chambers. The withdrawal conduits are usually relatively large, thus the slide valves which are placed therein are necessarily a large type of valve requiring rather expensive hydraulic or mechanical type of power to effect their automatic adjustment during the operation of the processing unit. Also, slide and gate type of valves, when used in fluidized particle processing, are subject to considerable wear and erosion from the continuous stream of particles such that it is necessary to spend considerable on upkeep and maintenance.

It is, therefore, a principal object of the present invention to provide in connection with fluidized processing means for eliminating the usual type of slide valve in effecting the control and rate of transfer of particles from one contacting zone to another.

It is a further object of the invention to utilize transversely positioned jet streams at the lower end of each particle withdrawal conduit from each zone, in a manner to regulate the flow of particles from each zone and the rate of particle transfer to the other of the contacting zones.

It is a still further object of the present invention to arrange and utilize the jet streams in a manner whereby instrumentation connecting with suitably located pressure and temperature sensitive instruments may be utilized in combination with the jet streams to effect continuous automatic control of the fluidized processing plant.

Briefly, the present simplified method of controlling the withdrawal and transfer of particles between contacting zones of a fluidized conversion unit, wherein the particles are contacted by different reactant streams in the different contacting zones, comprises the improvement of continuously withdrawing particles from each of the contacting zones in a relatively dense phase fluidized column, maintaining at least two jet streams of a fluid medium below each of the particle withdrawal columns, directing one jet stream upwardly into each descending column in a manner hindering the withdrawal of particles, directing the other of the jet streams in each case away from the particle column in a manner transferring particles to the other of the zones, and continuously proportioning stream flow between the jet streams at each withdrawal column of particles whereby to effect the regulation and control of the transfer of particles between contacting zones.

In a preferred operation and arrangement, the transversely positioned jet streams, at each withdrawal standpipe and descending column of particles, are fed with a similar or a common fluid medium and means such as a single two way valve is utilized to proportion the flow of the streams between the two jets, such that a constant gaseous or vaporous flow is divided between the two streams and the valve adjustment to increase one stream decreases the flow through the other and conversely.

A preferred arrangement also utilizes an off-center vane at the lower end of each of the withdrawal conduits, so that the latter is moved or controlled by the jet stream directed upwardly into the descending column of particles and the pressure variation effected by both the jet streams to provide a close control of the withdrawal of the particles. The off-center vane in each case operates to permit flow of particles only when the pressure below the vane is less than the pressure thereabove, and thus the aforementioned substantially vertical horizontal transverse jet streams, positioned below each of the withdrawal columns of particles, may be operated effectively in combination with the vane to regulate pressure therebelow and in turn regulate and control the flow of particles being withdrawn from one zone and transferred to the other.

It is, of course, a particular advantage of the present simplified method of operation to eliminate the expensive type of slide valve, hydraulic operating system, and instrumentation that is necessary in the operation of such valves. The present control system may also be used to advantage in connection with contacting zones which are maintained at substantially low levels, where there are no great standpipe heights utilized for building up dense phase pressure within the withdrawal column of particles and permitting differential pressure in the zones. In other words, the transverse jet streams at each of the withdrawal columns of particles may be regulated within a relatively wide range of pressure, such that different pressures may be maintained within each of the contacting zones. Further, in a preferred embodiment of the unit, which utilizes two way valving means to proportion the stream flow to each of the jet streams, automatic controls may be readily adapted thereto, whereby to provide a continuously operating plant and to effect the production of desired product streams from each of the conversion zones and to closely control the withdrawal and rate of transfer of particles between the zones.

Figure 2:
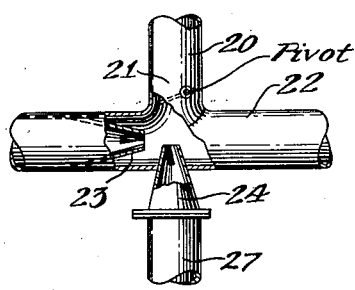

The accompanying drawing and the following description thereof will serve to more fully describe the operation of the present invention, while additional advantages will be apparent in connection with the description relating to the drawing. In the drawing, Figure 1 is a diagrammatic illustration of a conversion system embodying the invention and Figure 2 is a fragmentary detailed view, partially in section, of a portion of said system.

Referring now to the drawing, there is indicated a vertically disposed confined reaction chamber 1 and a similar vertically disposed chamber 2, indicated as a regenerator. For purposes of simplification, the subsequent description of the drawing will be directed toward the fluidized catalytic cracking of an oil stream, wherein a gas-oil contacts a suitable cracking catalyst in a reaction zone, and carbonized catalyst particles are continuously contacted with air or other oxygen stream in a regeneration zone to effect the burning and removal of carbonaceous contaminating material and to effect the heating of the particles to a desired temperature for supplying heat to the reaction zone. It is, however, not intended to limit the present operation to only the fluidized catalytic cracking of an oil stream, for obviously, the process and method of operation may be readily used in connection with any conversion operations which are adapted to the fluidized contacting of subdivided particles. A relatively dense phase fluidized bed of particles is maintained in the lower portion of the reactor 1, having an upper extremity indicated by the broken line 3, with the fluidization maintained by gases and vapors introduced to the lower end of the reactor 1 by way of riser line 4 and the perforated grid or distributing plate 5, which is in turn suitable to evenly distribute the gaseous stream across the entire cross-sectional area of the reaction zone.

In the present instance, hot reactivated catalyst particles are indicated as being transferred to the lower end of the reaction zone by way of the conduit 4 and by means of a steam stream which is indicated as being introduced through conduit 6 and control valve 7 to the riser line 4. The gas-oil or other hydrocarbon stream to be converted, is introduced to the riser line 4 by way of line 8 and control valve 9, and the resulting vaporous stream is distributed into the reaction zone in an upflow along with the subdivided catalyst particles. The hydrocarbon conversion product stream leaves the upper end of the reactor 1 by way of a particle removal and recovery apparatus 10 and the outlet line 11 having control valve 12. The recovery unit 10 is indicated as being of a centrifugal type of separator suitable to recover and collect entrained solid particles and return them to the dense phase bed 3 by way of a suitable dip leg 13.

Contaminated catalyst particles are continuously withdrawn from the bed 3 within the reaction zone 1 by way of a suitable withdrawal well 14 and conduit 15 which connects with a suitable enlarged stripping chamber 16. Preferably steam or other relatively inert fluid medium suitable to remove and strip occluded hydrocarbon vapors from the surface of the catalyst particles, is introduced by way of line 17 and control valve 18 at the lower end of the stripping chamber itself. Resulting stripped vaporous materials and the stripping medium pass outwardly from the top of the stripping zone, through conduit 19, to the upper portion of the reaction zone 1, while substantially stripped particles are continuously allowed to pass downwardly in a relatively compact or dense phase column of particles within the conduit or standpipe 20.

The standpipe 20 has a swinging vane member 21 positioned within the lower portion thereof and just above the conduit 22 which connects in a manner to transfer particles to the regeneration zone 2. Positioned directly below the conduit or standpipe 20 are two jet-like nozzles 23 and 24, the latter directed upwardly into the standpipe 20 and against the vane 21, in a manner to hinder the downward flow of particles past the off center vane, while the jet 23 is positioned transverse thereto and provides an eductor effect such that particles which are passed onwardly through the standpipe 20 and past the vane 21 are jetted into the conduit 22 and subsequently into the regenerating zone. In the present embodiment, air is indicated as being charged to conduit 25 and through the two way valve 26 to both the conduits 22 and 27, with the air passing through conduit 22 being jetted through the nozzle 23 and the air passing by way of conduit 27 being jetted through the vertical nozzle 24.

In accordance with the preferred operation of the present embodiment of the invention, a substantially constant quantity of air is introduced by way of line 25 such that adjustment of the two way valve 26 effects the proportioning of the air between the two jet nozzles 23 and 24. Thus, where it is desired to decrease the amount of particles withdrawn by way of the standpipe 20 and passing to the regenerating zone 2, the valve 26 is adjusted such that a quantity of gas passing upwardly through jet 24 and against the lower side of the vane 21 is sufficient to partially close the vane and slow down the withdrawal of particles, while simultaneously, the quantity of air decreases through jet nozzle 23 and the resulting eductor effect into transfer line 22 is decreased. In the reverse situation, where it is desired to have an increased flow of particles from the reaction zone to the regenerating zone, the valve 26 is adjusted to increase the jet flow to nozzle 23 and decrease the flow to nozzle 24 and against the lower side of the vane 21, so that a larger quantity of particles passes downwardly from the lower end of the standpipe and into the transfer conduit 22. Proper adjustment of the valve 26 maintains the desired proportion of the air stream between the jets and permits a close control of the withdrawal of particles from the reaction zone. The off-center vane is of advantage in the lower end of the standpipe 20 to aid in the response to the upwardly flowing jet stream from the nozzle 24 and pressure changes in the lower end of the conduit. In addition, the vane prevents an entire reversal of flow of particles upwardly into the reactor by way of the stripper and withdrawal well 14, for with a large quantity of fluidizing medium jetting upwardly from nozzle 24 the vane 21 closes and substantially prevents the gaseous medium passing on upwardly through the descending column of particles.

Automatic control of the proportioning valve 26 may be effected through suitable level control instrumentation as indicated in the drawing. A pressure sensitive control point within the upper portion of the reactor at 28 and a control point 29 at the lower end of the reactor, and suitable transmittal lines 30 and 31 respectively, which connect with a controller 32, provide for the continuous indication of the fluidized bed level within the lower portion of the reactor, so that proper or desired conversion conditions may be maintained within the reaction zone. The control 32, through control line 33 in turn connects with the valve 26 so as to effect continuous automatic regulation of the latter through motor or diaphragm control means.

The contaminated catalyst particles, being withdrawn from the reaction zone, are continuously passed by way of the riser conduit 22 into the lower end of the regenerating chamber 2 and continuously distributed through a grid or suitable perforated plate 34 into a relatively dense phase fluidized bed of particles maintained within the lower portion of the regenerator and indicated by the broken line 35. The air stream utilized to transfer the particles to the regenerator effects the burning and oxidation of contaminated carbonaceous matter on the particles, such that the latter may be continuously withdrawn from the regenerator substantially free of coke and carbon deposit. Particles being withdrawn are continuously passed through the withdrawal well 36 and the conduit or standpipe 37, while resulting combustion gases or flue gases pass from the upper end of the regenerating zone by way of a particle separator 38 and outlet conduit 39 having control valve 40. The particle separator 38 is advantageous in the recovery of entrained catalyst particles, preventing their passage with the flue gas to the stack, returning them to the contact bed within the lower part of the regenerator by way of a suitable dip leg 41.

The reactivated particles being withdrawn through standpipe 37, pass in a continuous descending column to the transfer conduit 4. As in connection with the withdrawal of particles from the reaction zone, an off-center swinging type of vane 42 is maintained within the lower end of the stand pipe 37, and transversely positioned nozzles or jets 43 and 44 are maintained at the lower end of the standpipe. The steam stream which is introduced by way of the conduit 6 and through proportioning valve 7, is split between the two jet nozzles, with a portion of the steam passing by way of the conduit 45 and jet 43 directly up into the standpipe 37 and against the lower side of the swinging vane 42, while the remaining portion of the steam passes through the substantially horizontal jet nozzle 44 in a jet eductor type of operation to transfer particles into the conduit 4. Also, in accordance with the preferred type of operation, a substantially constant volume or quantity of steam is introduced through line 6, such that adjustment of the proportioning valve 7 effects the transfer of a greater or lesser quantity of the particles to the reaction zone from the standpipe 37 and regeneration zone 2. As previously described in connection with the other withdrawal zone, an adjustment of the valve to increase flow through vertical jet 43 and decrease flow through eductor jet 44, provides a decrease in the rate of withdrawal of particles past the swinging vane 42, and a decrease in the volume of steam passing through jet 43 with an increase through jet 44 effects an increase in the rate of withdrawal of particles and in the rate of transfer to the reaction zone.

In an automatic type of operation, the proportioning valve 7 may be of the motor or diaphragm controlled type and connect with a suitable controller 46 through a control line 47. The present embodiment indicates the controller 46 as connecting with a temperature sensitive instrument 48 through a control line 49, such that the valve 7 is adjusted in relation to the variations in temperature within the bed 3, as noted by the temperature sensitive instrument 48. In a hydrocarbon cracking operation, such as indicated and described here, the temperature within the reaction zone may be controlled by the rate of flow of hot catalyst particles from the regeneration zone, so that where additional temperature is indicated as being required in the reaction zone, the controller 46 may operate to adjust the proportioning valve 7 to in turn allow a faster rate of withdrawal through line 37 and into the transfer line 4.

Automatic instrumentation is also indicated in the drawing in connection with the maintaining of pressures within the reaction and regeneration zones, with pressure sensitive instruments 50 and 51, in the reaction and regeneration zones respectively, connecting to a differential pressure controller 52 by means of suitable connecting lines 53 and 54. The controller 52 in turn connects by way of line 55 to valve 40, which may be motor or diaphragm operated to regulate the rate of discharge of flue gases from the regeneration zone and control the differential pressure between the two contacting zones.

It may be pointed out, that in connection with the gaseous streams being introduced into the different standpipes and into the transfer lines at each of the withdrawal zones, while it is preferable to use the same fluidizing medium through the transverse jets, it is possible to operate the regulation and control of the withdrawal of particles, by utilizing separate gaseous streams which have independent sources of supply. For example, at the lower end of the withdrawal conduit 20 where contaminated catalyst particles are withdrawn from the reaction zone, steam may be supplied through jet 24 to pass upwardly into the standpipe 20 and against the underside of the swinging off-center vane 21, while an air stream such as supplied to 25 and jet 23 may effect the eduction and transfer of particles to and through conduit 22. In this case, means may be provided for proportioning the stream flows through each of the jet nozzles 23 and 24 in a manner that the two way valve 26 proportions flow. In other words, as gaseous flow is increased through jet 23 the flow is decreased through jet 24 and conversely with the desire to increase flow through jet 24, the flow is decreased through jet 23.

It may again be noted, that it is not intended to limit the present improved and simplified operation which eliminates the slide valve type of flow control of particles, to the catalytic cracking of hydrocarbons in separate confined zones, for obviously, a similar operation may be applied to the conversion of other reactant streams which may in turn be effected advantageously within fluidized conversion zones, and in each case a suitable fluidizing or gaseous stream which is inert or useful in connection with the processing, is supplied to the control jets at the lower end of each of the particle withdrawal conduits from each of the separate confined conversion zones. Inert particles may be transferred in the same manner as the catalyst particles, for processes other than catalytic conversions, or alternately, subdivided particles may be contacted or treated in a fluidized operation and in separate zones transferring the particles in the manner of the present invention. For example, the treating and distillation of shale may be effected from finely ground shale particles being introduced to the reaction zone, together with hot ash-like particles, the latter being introduced to the reaction zone from a heating zone in order to supply the desired heat for distillation, and residual carbonaceous matter being burned from distillation residue in the regeneration zone to effect the desired heating of particles for return to the reaction zone.

I claim as my invention:

1. In a contacting process wherein a stream of fluid is passed upwardly through a fluidized bed of subdivided solid particles in a contacting zone and solid particles transferred from said zone to another zone, the improvement which comprises continuously withdrawing subdivided particles downwardly from the fluidized bed in said contacting zone in a relatively dense phase fluidized column, discharging the withdrawn particles into a transfer conduit disposed transversely with respect to said column and communicating with said other zone, maintaining at least two jet streams in said conduit below said column, directing one of said jet streams upwardly into said column in a manner hindering the discharge of particles therefrom, and directing another of said jet streams away from said column in the direction of said other zone.

2. The method of claim 1 further characterized in that a substantially constant rate of gaseous flow is independently proportioned between said jet streams whereby the increase in flow to one of said jets decreases flow through the accompanying jet.

3. In a fluidized contacting process wherein a hydrocarbon reactant stream contacts subdivided particles in a fluidized bed in a confined reaction zone, a reactivating gaseous medium contacts a fluidized bed of subdivided particles within a confined regenerating zone, resulting conversion product streams are continuously withdrawn from each of the zones, and contacted particles are continuously passed from each zone to the other to provide a continuous conversion process, the improvement which comprises, withdrawing contacted subdivided particles downwardly from the fluidized bed in each of said zones in a relatively dense phase descending and confined column of particles, maintaining transverse jet streams of air below the descending column of particles from said reaction zone, with one of said streams directed upwardly into said descending column of particles and hindering particle flow therefrom, directing the other of said transverse air streams away from the descending column of particles in a manner passing withdrawn particles to the lower end of said regenerating zone, proportioning a constant volume of air between said transverse jet streams and regulating pressure at the lower end of said column of particles and the withdrawal and transfer of contaminated particles from said descending column of particles to said regenerating zone, maintaining transverse jet streams of steam below the fluidized descending column of particles from said regenerating zone, directing one of said streams of steam upwardly into said descending column of particles and hindering the withdrawal of particles therefrom, directing the other of said jet streams away from the lower end of said column of particles and effecting the passage of regenerated particles to said reaction zone, and proportioning the steam between last said jet streams and effecting thereby the regulation and control of the transfer of regenerated particles to said reaction zone.

4. The method of claim 3 further characterized in that the proportioning of the air streams and the transfer of subdivided solid particles to the regeneration zone is varied in accordance with the fluidized bed level maintained within said reaction zone, and the proportioning of the steam streams regulating the withdrawal and transfer of regenerated catalysts to the reaction zone is varied in accordance with the temperature maintained within the fluidized bed of the reaction zone.

5. The method of claim 4 still further characterized in that internal pressure is measured within the upper portion of each of said contacting zones and the withdrawal of conversion product from one of said zones is regulated to maintain a substantially constant differential pressure between said contacting zones.

6. Apparatus for effecting the fluidized contacting of subdivided particles in a conversion process, comprising in combination, a vertically disposed reaction chamber and a vertically disposed regenerating chamber, each of said chambers having fluid and particle inlet means, fluid outlet means from the upper portion thereof and particle withdrawal means, each of the latter means having a substantially vertical conduit section connecting with particle transfer conduits, each transfer conduit extending from said vertical conduit sections to the other of said chambers, an off-center pivoted vane in the lower portion of each of said vertical outlet conduit sections, a fluid jet nozzle directed upwardly towards the vane in each of the outlet conduit sections, another jet nozzle directed across the lower end of each of said sections transversely to the first said nozzles and into said transfer conduits whereby particles passing downwardly through each of the withdrawal outlet sections are transferred to the other of said chambers, valve and conduit means connecting to each fluid jet nozzle at each withdrawal conduit section, said valve means proportioning fluid flow between said jet nozzles in each withdrawal conduit and thereby controlling pressure below each of said pivoted vanes and regulating flow of particles between chambers.

7. The apparatus of claim 6 further characterized in that said valve means connecting to the transversely positioned jet nozzles at each of said withdrawal conduit sections is a two-way valve, said two-way valve connecting to said transverse jet nozzles in a manner to proportion a constant flow therebetween, whereby an increase in flow through a jet nozzle directed upwardly into a vertical conduit section effects a decrease in the flow through the accompanying transverse nozzle directed into a transfer conduit, and conversely where flow is increased into a jet nozzle directed into said transfer conduit then flow is decreased through said accompanying nozzle directed upwardly into said vertical section.

8. A contacting apparatus comprising a contacting chamber, means for maintaining a fluidized bed of subdivided solid particles in said chamber, a downwardly extending standpipe communicating with the lower portion of said chamber, a transfer conduit connected to the lower end of said standpipe and to a second contacting chamber, said conduit being disposed transversely with respect to the standpipe, and a pair of fluid jet nozzles in said conduit adjacent the lower end of the standpipe, one of said nozzles being directed upwardly into the standpipe and the other being directed lengthwise of the transfer conduit in the direction of said second chamber.

9. A contacting apparatus comprising a contacting chamber, means for maintaining a fluidized bed of subdivided solid particles in said chamber, a downwardly extending standpipe communicating with the lower portion of said chamber, a transfer conduit connected to the lower end of said standpipe and to a second contacting chamber, said conduit being disposed transversely with respect to the standpipe, an off-center pivoted vane in the lower portion of the standpipe, and a pair of fluid jet nozzles in said conduit adjacent the lower end of the standpipe, one of said nozzles being directed upwardly into the standpipe toward said vane and the other being directed lengthwise of the transfer conduit in the direction of said second chamber.

JON BEAM.

REFERENCES CITED

The following references are of record in the file of this patent:

UNITED STATES PATENTS

| Number | Name | Date |
|---|---|---|
| 2,416,729 | Arveson | Mar. 4, 1947 |